(12) United States Patent
Chameroy et al.

(10) Patent No.: US 8,739,690 B2
(45) Date of Patent: Jun. 3, 2014

(54) PRESSURE COOKER GASKET HAVING A FLEXIBLE SKIRT PROVIDED WITH NOTCHES

(75) Inventors: Eric Chameroy, Veronnes (FR); Michel Pierre Cartigny, Mirebeau-sur-Beze (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 13/518,426

(22) PCT Filed: Dec. 21, 2010

(86) PCT No.: PCT/FR2010/052859
§ 371 (c)(1),
(2), (4) Date: Sep. 18, 2012

(87) PCT Pub. No.: WO2011/077037
PCT Pub. Date: Jun. 30, 2011

(65) Prior Publication Data
US 2013/0042765 A1    Feb. 21, 2013

(30) Foreign Application Priority Data

Dec. 23, 2009 (FR) .................................. 09 59553
Feb. 26, 2010 (FR) .................................. 10 51407

(51) Int. Cl.
*A47J 27/08*    (2006.01)
(52) U.S. Cl.
USPC .......................................................... 99/337

(58) Field of Classification Search
USPC .................... 99/337, 413; 277/628
See application file for complete search history.

(56) References Cited

U.S. PATENT DOCUMENTS

| 2,600,714 | A | | 6/1952 | Wenscott et al. |
| 4,024,982 | A | * | 5/1977 | Schultz .......................... 220/293 |
| 4,592,479 | A | | 6/1986 | Resende |
| 5,641,085 | A | | 6/1997 | Lonbardo |
| 6,695,319 | B1 | * | 2/2004 | Anota et al. .................. 277/628 |
| 2003/0209865 | A1 | | 11/2003 | Park |

FOREIGN PATENT DOCUMENTS

| DE | 202008011482 U1 | * | 12/2008 |
| EP | 0684001 A1 | | 11/1995 |

* cited by examiner

*Primary Examiner* — Dana Ross
*Assistant Examiner* — Renee L Miller
(74) *Attorney, Agent, or Firm* — The Webb Law Firm

(57) ABSTRACT

Provided is a sealing gasket for a cooking utensil for cooking food under pressure, the utensil includes a vessel and a lid that define a cooking enclosure. The gasket having a heel from which at least a first lip projects that is provided with at least one escape window notch that passes through its thickness, and in that the first lip forms a differential movement member enabling the escape window notch to effect a relative movement relative to the heel when the pressure prevailing inside the cooking enclosure exceeds a predetermined threshold, which relative movement enables said escape window notch to open up a leakage orifice via which the cooking enclosure is put into communication with the outside of the utensil. Cooking utensils for cooking food under pressure such as a pressure cooker are provided.

13 Claims, 3 Drawing Sheets

PRESSURE COOKER GASKET HAVING A FLEXIBLE SKIRT PROVIDED WITH NOTCHES

TECHNICAL FIELD

The present invention relates to the general technical field of utensils for cooking food under pressure in an atmosphere full of steam, such as pressure cookers.

The present invention relates more particularly to sealing gaskets designed to be put in place in such utensils so as to provide sealing between the inside and the outside of the utensil when it is in operation.

The present invention thus relates to a sealing gasket for a utensil for cooking food under pressure, said utensil comprising a vessel and a lid designed to be mounted on said vessel to define a cooking enclosure, said gasket being designed to be interposed between the lid and the vessel in order to seal said cooking enclosure, said gasket having a heel from which at least a first lip projects.

The present invention also relates to a utensil for cooking food under pressure, which utensil is equipped with or is suitable for being equipped with a sealing gasket of the invention.

PRIOR ART

Regardless of the type of utensil in question for cooking food under pressure, it is well known to use a sealing gasket, in particular made of an elastomer material, in order to provide sealing between the inside and the outside of the cooking enclosure while the utensil is being brought up to pressure and throughout the cooking cycle.

To that end, use is generally made of a gasket of the rope-seal type, or indeed a lip-seal gasket, that is compressed between the lid and the top rim of the vessel. In certain cases, such gaskets can also constitute safety members allowing steam to leak from the cooking enclosure when overpressure that is too great appears inside said cooking enclosure.

In order to enable said gasket to deform so as to perform such a safety function, it is known that the heel of the gasket can be locally pared away, by removing material at one or more locations starting from the peripheral surface of said heel.

Thus, one or more recesses are provided that enable the heel of the gasket to deform outwards until it comes to be flattened against the side edge of the lid or is even extruded through a window provided in the lid. In this way, the lip accompanies the local deformation of the heel in a radially outward movement in such a manner that, when the pressure prevailing in the cooking enclosure exceeds a predetermined value, the lip crosses the top rim of the vessel by tipping over the top of it, thereby breaking the sealing of the cooking enclosure and enabling the fluid that is at an excessive pressure to escape.

Although such devices undeniably offer advantages in terms of operating safety, by making it possible in particular to procure a last-resort safety level in the event that other regulation or safety devices are defective, they nevertheless suffer from certain drawbacks.

Firstly, the gasket can go relatively suddenly from its sealing configuration to its leakage configuration because of the sudden nature of the way the lip tips over the top of the rim of the vessel. That can result in a considerable and sudden discharge of steam, that can be full of scraps of food, and that can scald the user and soil the stove or the work surface.

In addition, a portion of the gasket, and in particular a lip, being forcibly extruded through a narrow passageway provided either in the lid itself or between the lid and the vessel rim, is conducive to damaging said gasket severely and irremediably, and the gasket must generally therefore be replaced after such a safety procedure has been triggered.

In addition, the presence of peripheral recesses results in local weakening of the gasket, and more particularly of its heel, thereby exposing it to risks of breaking under stress, and therefore tending to reduce the length of its life or indeed to reduce its reliability.

Finally, in certain models of pressure cooker, it is necessary to cause the deformation zones of the gasket to coincide with leakage passageways specifically provided for that purpose at the vessel and/or at the lid, so that the corresponding gasket requires particular care to be taken while mounting it in the utensil, and, for that purpose, such gaskets are sometimes provided with keying or indexing means designed to guarantee that they are put reproducibly into one position only.

Naturally, this gives rise to manufacturing constraints that generally complicate the manufacturing and assembly operations, both of the gasket and of the pressure cooker, and increase the cost thereof.

SUMMARY OF THE INVENTION

Objects assigned to the present invention are thus to remedy the above-mentioned drawbacks and to propose a novel sealing gasket for a cooking utensil for cooking food under pressure that makes it possible to guarantee operating safety for said utensil in the event of overpressure, while also being particularly reliable and robust.

Another object assigned to the invention is to propose a novel sealing gasket of particularly simple structure and that is inexpensive to manufacture.

Another object assigned to the invention is to propose a novel sealing gasket that operates in particularly controlled, reproducible, and safe manner, and that presents uniform and gradual behavior.

Another object assigned to the invention is to propose a novel sealing gasket that offers good ergonomics and that is easy and intuitive to put into place.

Another object assigned to the invention is to propose a novel sealing gasket capable of guaranteeing both preventive user safety at the beginning of the cooking cycle, and active user safety during said cooking cycle.

Another object assigned to the invention is to propose a novel cooking utensil for cooking food under pressure that has reinforced operating safety, improved reliability, and improved longevity.

Another object assigned to the invention is to propose a novel cooking utensil for cooking food under pressure that is of simplified structure, of simplified assembly, and of low production cost.

The objects assigned to the invention are achieved by means of a sealing gasket for a cooking utensil for cooking food under pressure, said utensil comprising a vessel and a lid designed to be mounted on said vessel to define a cooking enclosure, said gasket being designed to be interposed between the lid and the vessel in order to seal said cooking enclosure, said gasket having a heel from which at least a first lip projects, said gasket being characterized in that the first lip is provided with at least one escape window that passes through its thickness, and in that said first lip forms a differential movement member designed to enable the escape window to effect a relative movement relative to the heel when the pressure prevailing inside the cooking enclosure exceeds a predetermined threshold $P_S$, said relative movement enabling said escape window to open up a leakage orifice via which the cooking enclosure is put into communication with the outside of the utensil.

The objects assigned to the invention are also achieved by means of a cooking utensil for cooking food under pressure that is provided with a sealing gasket of the invention.

BRIEF DESCRIPTION OF THE DRAWINGS

Other objects and advantages of the invention appear in more detail on reading the following description, and by means of the accompanying drawings, given merely by way of non-limiting illustration, and in which.

DETAILED DESCRIPTION OF THE INVENTION

Figure 1:
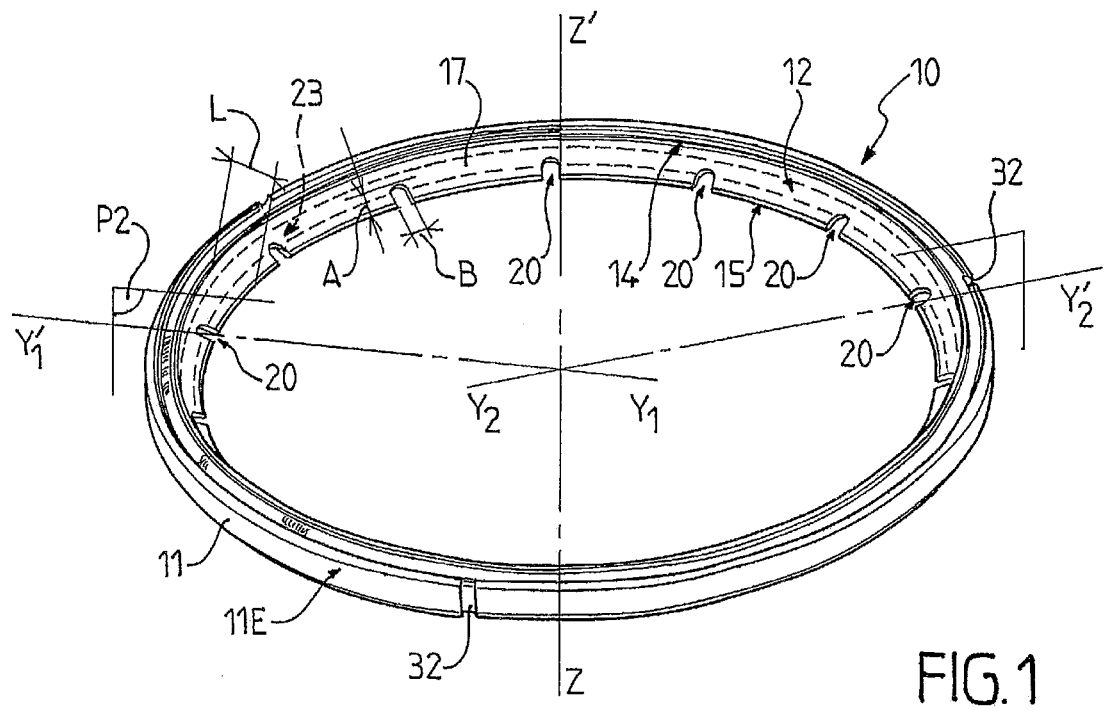
FIG. 1 is a perspective view from above of a variant embodiment of a sealing gasket of the invention.

The present invention relates to a cooking utensil 1 for cooking food under pressure, which utensil is preferably of the domestic pressure cooker type.

Said utensil 1 comprises a vessel 2 and a lid 3 that is designed to be mounted on said vessel, and more preferably that is designed to be placed on the top rim 4 of said vessel, to define a cooking enclosure 5.

Naturally, the present invention is in no way limited to a utensil for cooking food, and it can, in particular, be applied to other types of recipients designed to contain vapor, and more particularly steam, under pressure, such as, for example, autoclaves.

For convenience of description, it is considered below that the cooking utensil 1 is placed on a work surface $P_0$ that is plane and horizontal, the bottom 2A of the vessel resting on said work surface and the lid 3 being superposed on the vessel 2, substantially in register therewith along the vertical axis (ZZ') normal to said work surface.

Figure 3:
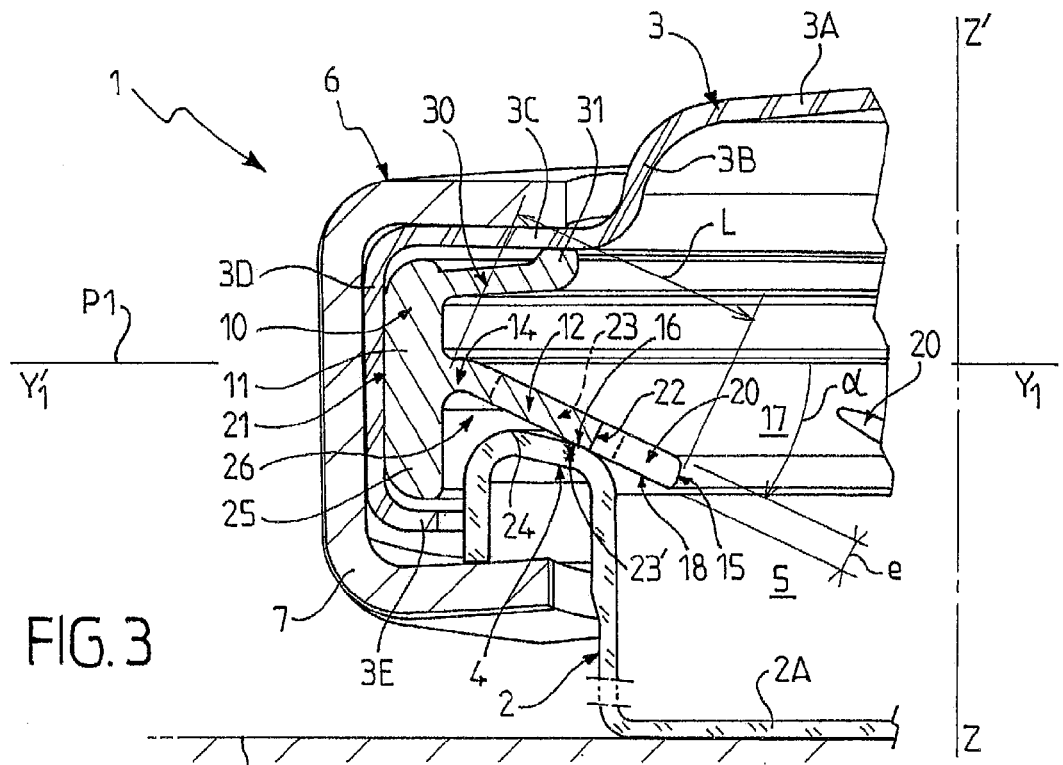
FIG. 3 is a fragmentary section view along a radial axis ($Y_1Y_1'$) of a variant embodiment of a cooking utensil of the invention in which a sealing gasket is mounted that corresponds to the sealing gasket shown in FIGS. 1 and 2, when the lid is locked on the vessel, and when the cooking enclosure is at a normal operating pressure.
Figure 4:
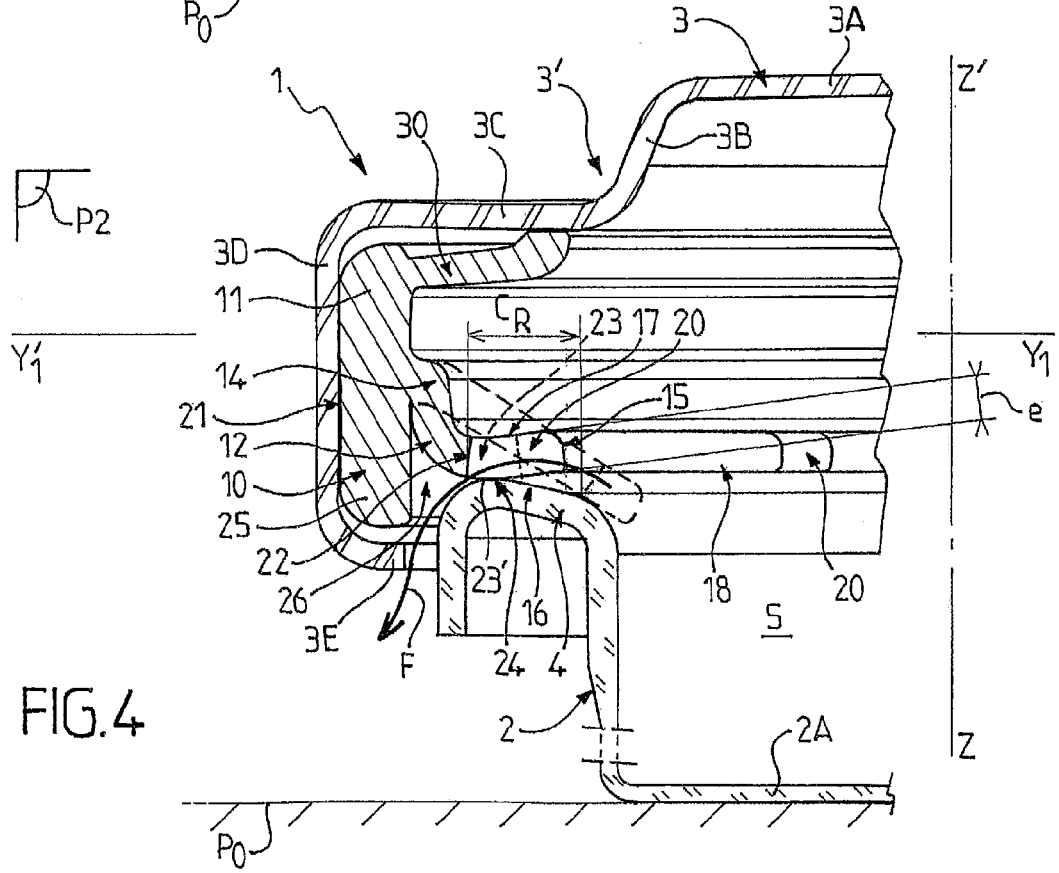
FIG. 4 is a fragmentary section view of the utensil shown in FIG. 3 when the pressure prevailing in the enclosure exceeds the predetermined pressure and causes the gasket to go over to its leakage configuration.
Figure 5:
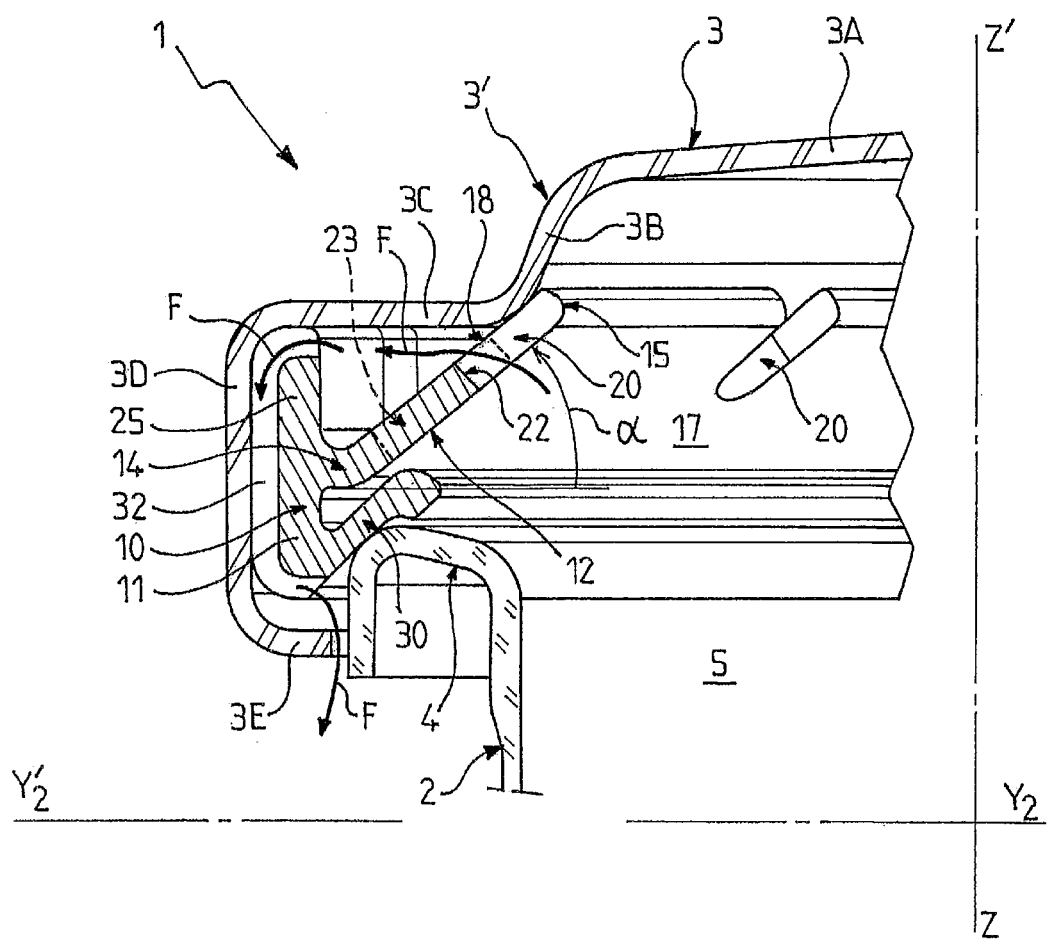
FIG. 5 is a fragmentary section view in a radial direction ($Y_2Y_2'$) showing the behavior of the gasket shown in FIGS. 1 to 4 when said gasket is mounted the wrong way up in the cooking utensil shown in FIGS. 3 and 4.

In a variant embodiment corresponding to the variant embodiment shown in FIGS. 3, 4, and 5, the lid 3 may be provided with a convex and raised central zone 3A that is continued radially outwards, going towards the outside of the lid 3, by a dropped flank 3B, itself followed by an annular flat 3C that is itself continued by a dropped annular edge 3D that is preferably substantially straight and vertical, which annular edge is terminated by an inwardly rolled end segment 3E.

Naturally, the lid 3 may be of any diameter or of any other implementation shape, and in particular be substantially flat, i.e. have a non-convex central zone 3A, without a dropped flank 3B, and coinciding directly with the annular flat 3C to form a substantially horizontal disk.

The top rim 4 of the vessel 2 may advantageously have a dropped edge, rolled or stamped from the top end of the vessel. The dished ledge formed by said top rim 4 may, in particular be substantially horizontal, or, preferably inclined slightly towards the inside of the vessel, as shown in FIGS. 3 to 5, and form a substantially frustoconical roof converging towards the inside and the bottom of said vessel.

Naturally, it is quite possible to adapt the invention to match any shape of vessel rim 4, and in particular to match a rim that is substantially flat and horizontal, or indeed a rim that is inclined downwards towards the outside of the vessel.

The lid 3 and the vessel 2 are advantageously made of a rigid material, and preferably of metal, suitable for withstanding the heat and the stresses of pressure cooking.

In known manner, the utensil 1 further comprises locking means 6 that make it possible to hold the lid 3 on the vessel 2 and more particularly to prevent the lid and the vessel from coming apart, and especially to prevent the lid from being expelled, when the cooking enclosure 4 is at its operating pressure.

Said locking means 6 can be in different forms without constituting a restriction on the invention, so long as they make it possible to perform, in alternation, and under the control of the user, locking and unlocking of the lid 3 relative to the vessel 2.

By way of example, said locking means 6 may implement a system having bayonet fittings, a locking bar, or segments, etc.

In a preferred variant embodiment shown in FIG. 3, said locking means 6 comprise at least one jaw 7 and preferably two jaws 7 that are diametrically opposite and that are mounted to move at least with a radial component on the lid 3, said jaws 7 being designed to come into engagement under the top rim 4 of the vessel 2.

In addition, the cooking utensil 1 is provided with a sealing gasket 10 that is designed to be interposed between the lid 3 and the vessel 2, in order to seal the cooking enclosure 5, under normal operating conditions, and more particularly when said cooking enclosure 5 is filled with steam at an overpressure substantially lying in the range 1 kilopascals kPa to 200 kPa, and at a temperature lying approximately in the range 100° C. to 135° C.

Said sealing gasket 10 has a heel 11 from which at least a first lip 12 projects, which lip extends from a root 14 that connects it to the heel 11 and to an opposite free end 15.

Advantageously, the first lip 12 is designed to come to bear against a seat 16 that can be formed by the lid or preferably, as shown in FIGS. 3 and 4, by the top rim 4 of the vessel, in order to form a sealed join between the lid 3 and the vessel 2.

Naturally, the invention is in no way limited to a particular shape of sealing gasket 10, which can match any particular shape of cooking utensil 1, and more particularly any particular shape of vessel rim 4 and of lid 3, and, in particular, may have a general geometrical shape that is substantially oval, square, polygonal, or of any other appropriate type.

Figure 2:
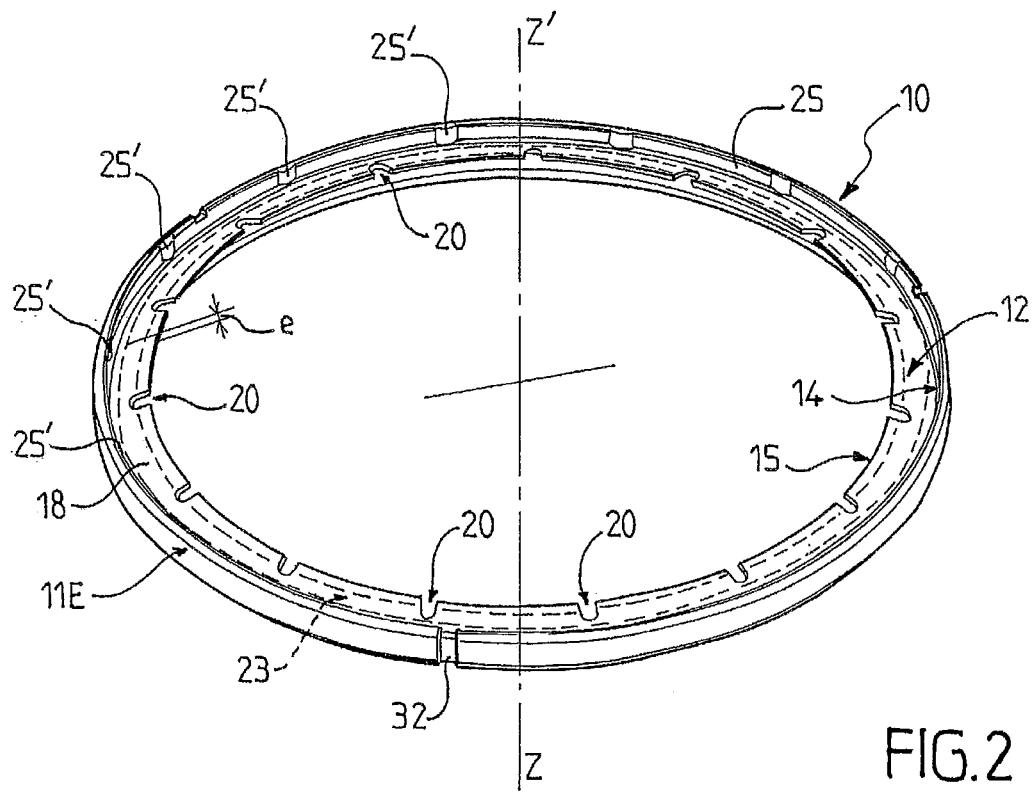
FIG. 2 is a perspective view from below of the sealing gasket shown in FIG. 1.

However, particularly preferably, and as shown in FIGS. 1 and 2, the sealing gasket 10 is substantially circularly symmetrical in overall shape, the generator axis of which shape corresponds to the vertical axis (ZZ'), and the same applies for the cooking utensil 1, and more particularly the vessel 2 and the lid 3, so that the first lip 12 may advantageously form a sealing band in contact with the vessel rim 4.

In addition, although the way in which the first lip 12 is disposed relative to the heel 11 is in no way limited to any particular variant embodiment, the heel 11 preferably surrounds said first lip 12 at the periphery thereof.

In other words, the heel 11 preferably forms a peripheral band containing the first lip 12, which lip forms a skirt projecting inwardly from said heel 11 towards the inside of the gasket 10. Thus, the first lip 12 preferably, and by construction, has at least one component of inward radial extension between its root 14 and its free end 15.

Preferably, said first lip 12 extends substantially rectilinearly from its root 14 to its free end 15, at least when the gasket 10 finds itself at rest, its top face 17 and its bottom face 18 being substantially plane.

In addition, the first lip 12 preferably has a thickness e that is substantially constant going from its root 14 to its free end 15, the top face 17 and the bottom face 18 preferably being substantially parallel to each other.

In accordance with an important characteristic of the invention, the first lip 12 is provided with at least one escape window 20 that passes through its thickness e, and said first lip 12 forms a differential movement member designed to enable the escape window 20 to effect a movement relative to the heel 11 when the pressure prevailing in the cooking enclosure 5 exceeds a predetermined threshold $P_S$, which movement enables said escape window 20 to open up a leakage orifice via which the cooking enclosure 5 is put into communication with the outside of the utensil 1.

Preferably, said predetermined threshold pressure $P_S$ lies substantially in the range 140 kPa to 270 kPa, or indeed in the range 180 kPa to 200 kPa, thereby making it possible to trigger putting the gasket into safety mode and causing a leak to appear when the pressure prevailing inside the cooking enclosure exceeds the pressure necessary for cooking and reaches a level deemed dangerous for the utensil or for the user.

Advantageously, the sealing gasket 10 of the invention is thus designed to be capable of going from a sealing configuration, in which said gasket 10 seals the cooking enclosure by forming a sealed join between the lid and the vessel, and more particularly in which the escape window 20 takes up a first position such that the first lip 12 co-operates in sealed manner with the seat 16, as shown in FIG. 3, to a leakage configuration, in which the sealing of the cooking enclosure 5 is broken at said gasket 10, and more particularly in which the escape window 20 takes up a second position distinct from the first position, and such that the cooking enclosure 5 communicates with the outside of the cooking utensil 1 via said escape window 20, which window thus forms a leakage orifice, as shown in FIG. 4.

Advantageously, the first lip 12 provided with its escape window(s) 20 forms, relative to the seat 16, and more particularly to the vessel rim 4, a moving closure member that is caused to change position by the level of pressure prevailing inside the cooking enclosure 5, so that it can thus act substantially analogously to a safety valve.

Preferably, the sealing gasket 10 of the invention is used redundantly as an additional safety member in a cooking utensil 1 that already has a regulator member for regulating the operating pressure, such as a rated valve and/or a safety member of the valve member type mounted on the lid.

The phrase "forms a differential movement member" means that the first lip 12 is designed to allow the escape window 20 to move to some extent relative to the heel 11, this relative mobility being necessary and sufficient, and preferably sufficient in itself, to enable the gasket 10 to go from its sealing configuration to its leakage configuration.

In other words, and although it is not excluded that the heel 11 itself can be moved under the effect of variations, and in particular of increase, in the pressure prevailing inside the cooking enclosure 5, said heel 11 then entraining the lip 12 and the escape window 20 with it in a first movement, it is the contribution of the first lip 12 to the additional movement of the escape window 20 relative to the heel 11, in a second movement, that makes it possible to put the cooking enclosure 5 into communication with the outside of the utensil 1, or, conversely to interrupt such communication.

Thus, the first lip 12 enables the escape window 20 to move along a path and through an amplitude that are distinct from any path or amplitude of movement of the heel 11.

Preferably, regardless of whether or not the heel 11 can move once the gasket has been put into place in the cooking utensil, said heel 11 is arranged to come into abutment against a retaining element 21, which can belong to the vessel 2 or to the lid 3, and that is designed to limit the radial expansion of the gasket 10.

The first lip is also preferably designed to allow the escape window 20 to move radially outwards relative to the heel 11 when said heel 11 finds itself in abutment against said retaining element 21.

In other words, the utensil is preferably arranged to cause a retaining element 21 to oppose movement of the heel 11 when the cooking enclosure is under pressure, so as to contain or indeed prevent outward radial expansion of the heel 11 when the cooking enclosure finds itself under pressure, while also allowing the escape window 20 to move residually, via the first lip 12, substantially along an axis $(Y_1Y_1')$ that is transverse to the vertical axis $(ZZ')$ and in a direction that tends to move said escape window away from said vertical axis.

Preferably, the retaining element 21 forms a radial abutment situated substantially in radial alignment with the escape window notch 20, and may, in particular, be formed by the dropped edge 3D of the lid 3, as shown in FIGS. 3 and 4, the first lip 12 moving in contact with the vessel rim 4.

Naturally, it is quite possible, conversely, for the retaining element 21 to be provided on the vessel 2 itself, e.g. in a shoulder of the vessel rim, while the first lip 12 is designed to come to bear against the lid.

In addition, the number of escape windows 20, and the position(s), and the shape(s) of it or of them are in no way limiting on a particular variant embodiment.

Thus, it is, in particular, possible to consider forming the windows by means of one or more perforations passing through the body of the lip, from the top face 17 to its bottom face 18, said perforations presenting a shape that is freely chosen and that can have a closed outline.

However, preferably, the escape window 20 or each of the escape windows 20 is formed by a notch that opens out in the free end 15 of the first lip 12, and, merely by convenience of description, may be considered to be such a notch below.

Preferably, each of said notches 20 has a cutout outline that is substantially U-shaped.

Advantageously, such a format is particularly simple to implement. In addition, its rounded shape with no shape corners makes it possible to limit any concentrations of stresses, and therefore to limit the risks of tearing, in the cut-out portion of the notches 20.

Particularly preferably, the first lip 12 has a plurality of notches 20 that are substantially identical and distributed uniformly around its perimeter, as shown in FIGS. 1 and 2.

Advantageously, the differential movement of the escape window notch 20 relative to the heel 11 takes place by elastic deformation of the first lip 12, said deformation preferably resulting from the stress from the pressure prevailing in the cooking enclosure 5 being applied directly to said first lip.

To this end, the first lip 12 is preferably made of an elastomer material, e.g. of silicone or of a synthetic rubber of the nitrile butadiene rubber type, the sealing gasket 10 particularly preferably being formed entirely of said elastomer material and in one piece.

Naturally, the person skilled in the art is capable of determining the shape and the dimensions that are appropriate for the first lip 12 in order to obtain the flexibility and the desired amplitude of movement relative to the heel 11, whatever material is selected for making the gasket.

In particular, the dimensions, and especially the thickness e of the first lip 12 are preferably chosen in such a manner that said lip can curve under the pressure, a little like a sail fills under the action of the wind, so that its top face 17 curves in on itself while its bottom face 18 bulges by being driven radially outwards.

By way of example, said thickness e may lie in the range 1 millimeter (mm) to 3 mm, and preferably lie in the vicinity of 1.8 mm.

In addition, the length L of the first lip 12, as measured from the root 14 to the free end 15, preferably substantially lies in the range 5 mm to 15 mm, and preferably lies in the vicinity of 13 mm.

In the invention, the necessary movement of the escape window 20, enabling the gasket 10 to go from its sealing configuration to its leakage configuration is borne at least partly, and preferably mostly, or indeed exclusively by the lip 12, and more particularly by the phenomenon of elastic deformation of said lip 12 under the effect of the pressure prevailing inside the cooking enclosure 5.

To this end, the first lip 12 preferably allows the escape window notch 20 to travel over a radial stroke $C_R$ relative to the heel 11 that lies substantially in the range 3 mm to 8 mm, and, for example, that lies in the vicinity of 4.5 mm.

More particularly, this radial stroke $C_R$ preferably corresponds, as shown in FIG. 4, to the variation in distance to the vertical axis (ZZ') from the end wall 22 of the notch 20, said end wall marking the separation between the continuous body of the first lip 12 and the void of said notch 20, when the notch 20 is moved under the action of the first lip 12 and when said lip goes from a sealed configuration, in which, in this example, it is substantially straight, as shown in dashed lines in FIG. 4, to a leakage configuration, in which, in this example, it is curved and contracted in on itself, as shown in continuous lines in FIG. 4.

In addition, the sealing gasket 10 is preferably designed so that the contact between the first lip 12 and the seat 16, and more particularly between the first lip and the top rim 4 of the vessel 2, is maintained substantially in an intermediate segment 23 of said first lip 12, the distance of said intermediate segment from the free end 15 lying substantially in the range 0.2 times the length L of the first lip to 0.7 times the length L of the first lip.

Advantageously, such a constructional feature makes it possible for the gasket 10 to come into contact with the seat 16, and more particularly with the vessel top rim 4, substantially over an annular contact strip 23' that is and remains situated facing the central portion of the body of the lip, both while the lid is being put into place on the vessel, and while the gasket is going into its leakage configuration.

Thus, said lip 12 has, as it were, kind of reserves of length that enable it to move functionally, in the same direction as its length L, relative to the seat 16, without totally losing contact therewith, including when the gasket finds itself in the leakage configuration.

More particularly, it is thus possible to cause the end wall 22 of the notch 20 to cross the annular crest line 25 corresponding to all of the highest points of the vessel rim 4, so as to generate a leak over the top of said rim, while also maintaining the portions of the first lip 12 that laterally flank said notch 20 in contact with the seat 16 against the inner slope of said rim 4, set back from said crest line 24.

Thus, the portions of the first lip 12 that laterally flank the notch(es) 20 advantageously form retaining flaps suitable for maintaining said first lip 12, and more particularly its free end 15, inside the perimeter defined by the crest line 24, thereby preventing any possibility of the free end 15 accidentally tipping over the top of the rim 4, and it avoids any extrusion of the gasket 10 and of the first lip 12 between the lid and the vessel, over the top of the rim 4.

In the event of the safety function of the gasket 10 being triggered, such an arrangement gives the utensil behavior that is particularly predictable, gradual, safe, and non-damageable to the gasket.

Preferably, the or each of the notches 20 penetrates into the first lip over a length of about 0.4 times the length L of said first lip 12 to 0.7 times said length L. In particular, the notches 20 may thus be of depth A, as measured from the end wall 22 to the free end 15, substantially lying in the range 5 mm to 9 mm, and, for example, lying in the vicinity of 7 mm.

The width B of said notches 20 may substantially lie in the range 2 mm to 8 mm, and for example, lie in the vicinity of 6 mm.

Naturally, the person skilled in the art is capable of determining the dimensions of the escape windows 20, and in particular the depth of the notches, in view of the length of the lip and of the geometrical shape of the vessel rim 4 so that the sealing gasket 10 can firstly provide suitable sealing for the cooking enclosure 5 under normal operating conditions, and secondly trigger a safety leak, advantageously through the escape windows 20 alone, in the event of overpressure that is excessive with regard to the predetermined threshold $P_S$.

To this end, proportions and geometrical shapes other than those shown in the figures may naturally be considered.

Although it is not precluded for the radially outside periphery 11E of the heel 11 to be provided with one or more setbacks or cutouts, said radially outside periphery 11E is preferably substantially, or indeed totally, exempt of any setbacks in register with the escape window(s) 20.

Advantageously, since the escape window 20 is moved by the first lip 12, it is no longer necessary to deform the heel 11 itself in order to cause the gasket 10 to go from its sealing configuration to its leakage configuration.

Therefore, it is not necessary to provide clearance and deformation zones in the heel itself, which advantageously makes it possible substantially to keep for said heel a shape that is convex, uniform, and exempt from recesses, flats, or concave cutouts.

Advantageously, by maintaining a heel 11 substantially continuous and of thickness substantially constant over its entire periphery, no zones weakening the gasket are created, and the gasket is therefore more robust.

In addition, such a heel 11 may advantageously form a kind of banding of substantially constant diameter, suitable for coming to bear substantially continuously, uniformly, and evenly against the retaining element 21, and more particularly against the dropped edge 3D of the lid 3, including at rest, when the pressure prevailing inside the cooking enclosure is less than the safety threshold $P_S$, thereby guaranteeing that it is positioned appropriately and that it is held firmly inside the lid.

In addition, the heel 11 may advantageously be extended by a centering projection 25 that is substantially vertical, that is designed to come to be interposed between the laterally outside portion of the vessel rim 4 and the laterally inside face of the dropped edge 3D in order to guarantee that the lid 3 is centered on the vessel 2.

Preferably, said centering projection 25 forms a band that is provided with a plurality of protuberances 25' projecting radially inwards from said band, and that are designed to provide a plurality of bearing points against the vessel rim, spaced apart from one another. Thus, the centering takes place advantageously in spot manner at said protuberances 25' rather than continuously over the entire radially inside surface of the centering projection 25.

Preferably, the sealing gasket 10 also has a clearance zone 26 situated in the hollow lying between the centering projection 25 and the first lip 12.

Advantageously, such a clearance zone 26 may serve not only for centering the lid on the vessel, by receiving the vessel rim 4 when the gasket comes to cap said rim in overlapping manner, but also for providing a zone for receiving the material making up the first lip 12, when said lip shifts outwards while it is being driven and deformed under the effect of the pressure, the clearance zone 26 thus freeing up space necessary for said first lip 12 to move, and for the escape window 20 to move.

To this end, the first lip 12 preferably, at least when the gasket 10 is at rest, has a substantially plane structure that is inclined, downwards in FIGS. 3 and 4, at an angle α substantially lying in the range 20° to 50°, and preferably lying in the vicinity of 35°, relative to the horizontal plane P1 of the gasket, itself substantially parallel to the work surface $P_0$.

Advantageously, as shown in FIG. 2, each notch 20 may also be situated in an angular sector corresponding to the span between two successive protuberances 25', and in particular substantially centered in said angular sector.

Thus, once the gasket is in place, each notch finds itself radially in register with an angular sector of said gasket, in which sector the radially inside surface of the centering projection 25, supported by its protuberances 25' that act as spacers, is substantially lifted off the vessel rim and kept at some distance therefrom, thereby firstly maximizing the available space offered by the clearance zone 26 in register with said notch, and secondly contributing to forming a leakage passageway available between the bottom face 18 of the lip 12 and the outside.

In addition, the sealing gasket is preferably provided with a second lip 30 that projects from the heel 11, said second lip 30 being stiffer and shorter than the first lip 12. Preferably, said second lip 30 is designed to come to bear in sealed manner against an element opposite from the element on which the first lip 12 comes to rest, and more particularly against the lid.

To this end, said second lip 30 can be provided with an end bead 31 that comes to be flattened against the annular flat 3C.

The sealing gasket 10 thus preferably has a cross-section that is substantially divergent V-shaped, the first and second lips being superposed, on the same side of the heel, in a substantially asymmetric structure.

In particularly preferable manner, the second lip 30 is continuous, and is totally exempt from any escape window or notch.

Advantageously, the asymmetric structure, and the higher stiffness of the second lip 30, make it possible to indicate to an inattentive user that the gasket has been mounted improperly.

If the gasket 10 is mounted the wrong way up, the second lip 30 finds itself disposed such that it exerts particularly high resistance to the lid being brought closer to the vessel, as shown in FIG. 5.

In addition, in accordance with a characteristic that can constitute an invention in its own right, the escape window(s) 20 is/are disposed in such a manner as to be able to co-operate with the lid 3, or respectively with the vessel 2, when the gasket 10 is mounted the wrong way up in the utensil 1, in order to form a permanent leakage orifice between the cooking enclosure 5 and the outside of the utensil, as shown in FIG. 5.

In other words, it is possible to use the same means, namely the escape window 20 provided in a lip of the gasket, to perform two distinct safety functions, and more precisely for firstly, in a first function, creating a permanent leakage orifice preventing pressure from building up inside the cooking utensil 1 in the event that the gasket 10 is mounted the wrong way up, and secondly, in a second function, when said gasket 10 is mounted the right way up, for enabling said gasket 10 to go from a sealing configuration to a leakage configuration by creating a temporary leakage orifice when the pressure prevailing inside the cooking enclosure exceeds a critical threshold $P_S$.

To this end, the depth of the notch 20, and the angle α of the first lip 12, are chosen in such a manner that, when the gasket is mounted the wrong way up, the first lip 12 comes to bear against the lid 3 while creating, through the notch 20, a permanent passageway between the inside wall of the lid and the end wall 22 of said notch.

Advantageously, as shown in FIGS. 1 and 5, removal recesses 32 may be provided in the outside periphery 11E of the heel over its entire height, and in the bottom and top end faces of said heel, so as to create leakage passageways between the heel 11 and the lid 3, and more particularly between the heel 11 and the annular flat 3C and then the dropped edge 3D.

Thus, when the gasket is mounted the wrong way up, the cooking enclosure advantageously communicates with the outside of the utensil 1 via a top leakage passageway that substantially extends along the inside wall of the lid 3 and allows a flow of steam F to leak permanently, thereby preventing pressure from building up inside the utensil.

Operation of a cooking utensil 1 of the invention is described below with reference to the preferred variant embodiment shown in FIGS. 3 and 4.

The sealing gasket 10 is firstly put into place in the lid 3, in such a manner that its radially outside periphery 11E comes to be pressed against the inside face of the dropped edge 3D while the bead 31 of the second lip 30 comes into abutment against the annular flat 3C. Preferably, the heel 11 takes up a position relative to the lid 3 that is radially and axially stationary and in which it remains substantially throughout the normal cooking cycle, and when the gasket goes into its leakage configuration.

The lid is then mounted on the vessel 2, substantially in a downward axial approach movement, until the first lip 12 comes into contact with the top rim 4 of the vessel 2, substantially over an annular contact strip 23' localized at the intermediate segment 23 of the first lip 12.

The sealing gasket 10 thus creates, respectively by means of its first lip 12 and by means of its second lip 30, a lower first sealing band against the seat 16, which is situated on the vessel in this example, and a second sealing band against the lid 3, at the end bead 31.

Advantageously, the first lip 12 comes to cap the top rim of the vessel, the gasket 10 overlapping said top rim 4 so that the free end 15 of the first lip 12 penetrates gradually into the vessel while the centering projection 25 remains outside, beyond the top rim of the vessel, between said top rim and the dropped edge 3D of the lid, thereby centering the lid on the vessel and stabilizing it thereon.

The user then locks the lid onto the vessel by actuating the locking means 6, and more particularly by bringing the jaws 7 radially closer together so as to engage them under the vessel top rim 4, as shown in FIG. 3.

The gasket 10 is then in a sealing configuration, in which it prevents any communication between the cooking enclosure 5 and the outside of the utensil.

With the cooking utensil 1 being placed on a heat source, the pressure prevailing inside said cooking enclosure 5 can then rise gradually until it reaches a normal operating value.

Advantageously, the utensil is provided with one of more regulator members, such as rated valves, making it possible to regulate said operating pressure.

So long as the pressure prevailing inside the cooking enclosure remains less than the safety threshold $P_S$, the gasket 10 maintains sealed contact with the seat 16.

More particularly, as shown in FIG. 3, the contact strip 23' extends upstream from the first lip 12, at a continuous portion of the intermediate segment 23 between the root 14 and said end wall 22 of the notch 20.

The contact between the first lip 12 and the seat 16 is thus continuously guaranteed in sealed manner over the entire periphery of said seat 16, while the portion provided with the escape window 20 is suspended within the sealing perimeter defined by said contact strip 23'.

The more the pressure increases inside the cooking enclosure 5, the more the first lip 12 is stressed and the larger the elastic deformation to which it is subjected.

More particularly, the internal pressure tends to force the diameter of the gasket 10 to expand to a certain extent, the heel of the gasket nevertheless remaining substantially contained by the retaining element 21, in such a manner that the first lip, which remains free to deform, tends to be pushed radially outwards while bending at its root 14, which tends to press its bottom face 18 against the radially inside face of the heel, and more particularly against the inside face of the centering projection 25.

Said first lip 12 thus tends to penetrate into the clearance zone 26 by shifting outwards, this movement being accompanied by said first lip 12 bending in on itself 12, its top face 17 folding in on itself to go gradually from a substantially plane shape, shown in dashed lines in FIG. 4, to a substantially concave shape, shown in continuous lines in FIG. 4. More particularly, in this example, this behavior results from the combined action firstly of the pressure prevailing inside the cooking enclosure, said pressure forcing the first lip to bend locally, at the root 14, while increasing its angle α, and secondly of the top rim 4 of the vessel that tends to provide substantially vertical retaining and guiding for the free end of said lip.

As the portion of the first lip 12 that is situated in the vicinity of the root 14 is folded outwards, against the heel, said portion entrains the free end 15 and therefore the notch 20 with it in a shift movement including an outward radial component.

In addition, it is remarkable that, in a cooking utensil that is closed by jaws 7, the lid 3 can, under the effect of the pressure, undergo a certain amount of deformation in the angular sectors not covered by the jaws 7, substantially in an upwards axial movement in this example, so that the gasket 10, and more particularly its heel 11, substantially follows this lifting movement. The movement of the notch 20 can thus also, in particular in combination with its radial component, include a useful axial component facilitating opening up of a leakage orifice.

In other words, the lid 3 can be held on the vessel 2 by spaced-apart locking means 6, such as jaws 7, said lid 3 having one or more unobstructed portions 3' between said locking means, the sealing gasket 10 being placed in such a manner that at least one escape window 20 is situated substantially in register with one of said unobstructed portions 3', such that the deformation of the corresponding unobstructed portion 3' under the effect of the pressure prevailing inside the cooking enclosure contributes to usefully moving said escape window 20, making it possible to open up a leakage orifice when said pressure exceeds a predetermined threshold $P_S$.

More generally, in accordance with a preferred characteristic that can constitute an invention in its own right, the lid 3 can thus have one or more unobstructed portions 3' that are substantially movable or deformable under the effect of the pressure, said unobstructed portions corresponding, for example, to the angular sectors between two successive jaws 7, while the gasket 10 is placed in such a manner that at least one escape window 20 is situated substantially under one of the unobstructed portions 3', in such a manner that the overall change in position of the escape windows 20 relative to the seat 16, which change in position makes it possible to form the leakage orifice(s), results at least in part, if not entirely, from the movement of the lid 3, or indeed from the combination of the respective movements of the lid and of the first lip 12.

If the pressure prevailing inside the cooking enclosure is sufficiently high, and, in this example, if it reaches and exceeds the safety threshold $P_S$, the movement and the deformation of the first lip 12, and more particularly the sliding of its bottom face 18 along the rim 4 and in contact therewith, are of amplitude sufficient for said bottom face 18 to disengage and to lift progressively off said vessel rim until it loses contact therewith facing said notch 20, thereby creating a leakage orifice at said notch 20, and thus making it possible for a leakage flow F to appear that removes the overpressure from the cooking enclosure 5.

In other words, if consideration is given to the behavior of the gasket in a vertical radial section plane P2, it can be observed that, while the heel 11 of the gasket is retained in a substantially stationary radial position in radial alignment with the first lip 12, the deformation of said first lip 12 in register with said heel 11 allows the notch 20 to move relative thereto, the amplitude and the path of which movement are sufficient to cause the contact strip 23' to migrate from the continuous zone of the first lip 12, situated upstream from the end wall 22 of the notch, to the non-continuous zone situated downstream from said end wall, between the end wall 22 and the free end 15.

Thus, this migration of the escape window 20, and more particularly of the end wall 22, relative to the seat 16, causes the contact strip 23' to "retreat" or to "descend" relative to the first lip 12, towards the free end 15, thereby gradually uncovering the escape windows 20, the vessel rim behaving, relative to them, a little like a sash sliding in a sash window.

This progressive opening of the escape window(s) 20 onto the outside of the utensil locally interrupts the initial continuity of said contact strip 23', by thereby putting the cooking enclosure 5 into communication with the surrounding environment of said utensil. Preferably, this putting into communication takes place in the unobstructed zones of the lid, and, for example, in the zones not covered by the jaws 7, so as to allow the flow of steam F to flow out downwards from the utensil.

To this end, it is remarkable that the gasket 10 of the invention makes it possible to open up gradually one or more leakage orifices, by gradually, as a function of the pressure prevailing inside the vessel, bringing the escape windows 20 clear of the seat 16 that initially obstructs and/or covers them.

Advantageously, this progressive increase in the working through section of the escape windows 20 makes it possible to obtain a controlled leakage flow rate, appropriate to and preferably substantially proportional to the overpressure level encountered. The gradual nature of the opening is advantageously reinforced by the curved profile of the cutout defining the end wall 22 of each of the notches 20.

In addition, throughout the deformation of the first lip 12, said lip advantageously remains in contact with the vessel rim, since the "flaps" that laterally flank each notch 20 remain in contact with the seat 16, and more particularly remain set back from the crest line 24.

Thus, the rim of the vessel always overlaps the base of each notch 20 at least in part, in such a manner that the free end 15 of the lip does not cross the crest line 24, even when the gasket 10 finds itself in its leakage configuration. Such an arrangement prevents the gasket 10, and more particularly the first lip 12 from being locally extruded by tipping over the top of the vessel rim 4.

Advantageously, by thus allowing the lip and the escape window 20 to move in controlled manner only as far as necessary and sufficient for causing one or more leakage orifices suitable for removing the overpressure to be opened up, so that the movement is sufficiently limited to prevent the free end 15 of the first lip from being expelled over the top of the vessel rim, the guidance of said gasket is preserved and irreversible damage to it is avoided.

Thus, the behavior of the sealing gasket in the event of safety triggering is advantageously reversible, because the first lip 12 continues to be guided against the vessel rim 4, regardless of whether the escape windows 20 are obstructed or unobstructed by said vessel rim.

In addition, the multiplicity of the escape windows 20 and the uniform circularly symmetrical shape of the gasket advantageously allow said gasket 10 to be mounted simply and intuitively in the lid 3, without any particular constraint as regards angular positioning relative to the lid or to the vessel, and without adversely affecting the operating safety or the longevity of the utensil.

In addition, the deformation necessary for safety operation of the gasket 10 of the invention is advantageously borne by a member (the first lip 12 in this example) that is particularly flexible, resistant to being stressed back and forth, and on which the deformation stresses are distributed relatively uniformly, thereby considerably limiting the risk of localized damage or indeed of breakage.

To this end, it is remarkable that the functional deformation of the gasket 10 takes place in a substantially distributed and balanced manner over the largest dimension of said gasket, namely its perimeter, and more particularly in each vertical plane containing the axis (ZZ'), by the gasket bending about a bending axis that is substantially horizontal, and thus perpendicular to the axis (ZZ'), and tangential to the generator circle of the first lip 12, unlike what happens on known gaskets, in which the gasket is forced to bend in a horizontal plane about an axis that is substantially vertical and parallel to the axis (ZZ'), by locally causing a severe concentration of stresses.

In addition, the simplicity of operation of the gasket 10 advantageously does not require any complex arrangement of the lid or of the vessel, and, in particular, makes it possible not to have to provide any window for extruding the gasket, or to have to pare away the lid and/or the vessel in order to provide special leakage orifices in them.

The overpressures can advantageously be removed substantially over the entire periphery of the lid, the clearance zone 26 forming, in practice, a removal collector suitable for collecting the leakage flow of steam F coming from any of the escape windows 20, and for removing this gas flow via any gap created by the clearance existing between the rolled edge of the lid 3E and the vessel rim 4 and causing the clearance zone 26 to communicate freely with the outside of the utensil.

The present invention is particularly applicable to making utensils for cooking food under pressure and to manufacturing gaskets for such utensils.

The invention claimed is:

1. A sealing gasket for a cooking utensil for cooking food under pressure, said utensil comprising a vessel and a lid designed to be mounted on said vessel to define a cooking enclosure, said gasket being designed to be interposed between the lid and the vessel in order to seal said cooking enclosure, said gasket having a heel from which at least a first lip projects, said gasket being characterized in that the first lip is provided with at least one escape window notch that passes through its thickness, and in that said first lip forms a differential movement member designed to enable the escape window notch to effect a relative movement relative to the heel when the pressure prevailing inside the cooking enclosure exceeds a predetermined threshold, said relative movement enabling said escape window notch to open up a leakage orifice via which the cooking enclosure is put into communication with the outside of the utensil.

2. A gasket according to claim 1, wherein the heel is arranged to come into abutment against a retaining element belonging to the vessel or to the lid and designed to limit the radial expansion of said gasket, and in that the first lip is designed to allow the escape window notch to move radially outwards relative to the heel when said heel finds itself in abutment against the retaining element.

3. A gasket according to claim 1, wherein the first lip allows the escape window notch to travel over a radial stroke relative to the heel that substantially lies in the range 3 mm to 8 mm.

4. A gasket according claim 1, wherein the first lip has a length L between its free end and its root that connects it to the heel, and in that said gasket is designed so that the contact between the lip and the top rim of the vessel is maintained substantially in an intermediate segment of said lip, the distance of the intermediate segment from the free end substantially lying in the range $0.2 \times L$ to $0.7 \times L$.

5. A gasket according to claim 1, wherein the first lip has a length L, as measured between its root and its opposite free end, substantially lying in the range 5 mm to 15 mm, and preferably lying in the vicinity of 13 mm.

6. A gasket according to claim 1, wherein the at least one escape window notch is formed by a notch that opens out in a free end of the first lip.

7. A gasket according to claim 6, wherein with the first lip having a length between its free end and the root that connects it to the heel, the notch penetrates into the first lip over a length lying approximately in the range $0.4 \times L$ to $0.7 \times L$.

8. A gasket according to claim 1, wherein the first lip is made of an elastomer material, e.g. of silicone or of synthetic rubber, and has a thickness substantially lying in the range 1 mm to 3 mm, and preferably lying in the vicinity of 1.8 mm.

9. A gasket according to claim 1, wherein the heel surrounds the first lip at its periphery and in that a radially outside periphery of said heel is substantially exempt from reinforcements in register with the escape windows notch.

10. A gasket according to claim 1, wherein it has a second lip projecting from the heel, said second lip being stiffer and shorter than the first lip.

11. A gasket according to claim 1, wherein the escape window notch is disposed in such a manner as to be able to co-operate with the lid or with the vessel, when the gasket is mounted the wrong way up in the utensil, in order to form a permanent leakage orifice.

12. A cooking utensil for cooking food under pressure, wherein it is provided with a sealing gasket according to claim 1.

13. A cooking utensil for cooking food under pressure according to claim 12, wherein it has a lid held on a vessel by spaced-apart locking means, such as jaws, said lid having one or more unobstructed portions between said locking means, and in that the sealing gasket is placed in such a manner that at least one escape window notch is situated substantially in register with one of said unobstructed portions, such that the deformation of the corresponding unobstructed portion under the effect of the pressure prevailing inside the cooking enclosure contributes to usefully moving said escape window notch, making it possible to open up a leakage orifice when said pressure exceeds a predetermined threshold.

\* \* \* \* \*

UNITED STATES PATENT AND TRADEMARK OFFICE
CERTIFICATE OF CORRECTION

PATENT NO. : 8,739,690 B2
APPLICATION NO. : 13/518426
DATED : June 3, 2014
INVENTOR(S) : Eric Chameroy et al.

It is certified that error appears in the above-identified patent and that said Letters Patent is hereby corrected as shown below:

In the Claims:

Column 14, Line 37, Claim 4, after "according" insert -- to --

Signed and Sealed this
Ninth Day of September, 2014

Michelle K. Lee
*Deputy Director of the United States Patent and Trademark Office*